US008942838B2

(12) United States Patent
Stahley

(10) Patent No.: US 8,942,838 B2
(45) Date of Patent: Jan. 27, 2015

(54) MEASUREMENT SYSTEMS ANALYSIS SYSTEM AND METHOD

(75) Inventor: Steven Stahley, Oldenburg, IN (US)

(73) Assignee: Cummins Intellectual Property, Inc., Minneapolis, MN (US)

(*) Notice: Subject to any disclaimer, the term of this patent is extended or adjusted under 35 U.S.C. 154(b) by 129 days.

(21) Appl. No.: 13/448,315

(22) Filed: Apr. 16, 2012

(65) Prior Publication Data
US 2013/0103174 A1 Apr. 25, 2013

Related U.S. Application Data

(60) Provisional application No. 61/475,974, filed on Apr. 15, 2011.

(51) Int. Cl.
G06F 19/00 (2011.01)
G06F 17/00 (2006.01)
G06Q 10/06 (2012.01)
G06K 9/62 (2006.01)

(52) U.S. Cl.
CPC .............. G06F 17/00 (2013.01); G06Q 10/06 (2013.01); G06K 9/6261 (2013.01)
USPC ............. 700/97; 700/103; 700/108; 702/182

(58) Field of Classification Search
None
See application file for complete search history.

(56) References Cited

U.S. PATENT DOCUMENTS

| | | |
|---|---|---|
| 5,452,218 A | 9/1995 | Tucker et al. |
| 6,577,986 B1 | 6/2003 | Casey-Cholakis |
| 6,631,305 B2 | 10/2003 | Newmark |
| 6,922,600 B1 | 7/2005 | Conrad et al. |
| 6,961,732 B2 | 11/2005 | Hellemann et al. |
| 7,006,084 B1 | 2/2006 | Buss et al. |
| 7,272,532 B2 | 9/2007 | Shafer et al. |
| 2004/0158338 A1 | 8/2004 | Mammoser et al. |
| 2009/0093903 A1* | 4/2009 | Clemens et al. ............... 700/109 |
| 2011/0040510 A1* | 2/2011 | Nishida ........................... 702/82 |

* cited by examiner

Primary Examiner — Sean Shechtman
(74) Attorney, Agent, or Firm — Faegre Baker Daniels LLP

(57) ABSTRACT

This disclosure provides a method and system for measurement system analysis (MSA) that present a structured and effective way of performing an MSA. The MSA system and method involves determination of a category of MSA for a measurement system based on an application of the measurement system, a quantification of measurement variation, calculation of a decision rule value based on the quantified measurement variation and a decision rule associated with the determined category, a determination of whether the measurement system is capable of performing MSA for the category based on a comparison of the calculated decision rule value and a decision rule threshold value, and applying a measurement system determined as capable for performing MSA to manage.

7 Claims, 12 Drawing Sheets

MEASUREMENT SYSTEMS ANALYSIS SYSTEM AND METHOD

FIELD OF THE INVENTION

The invention relates to a system and method for measurement systems analysis.

BACKGROUND

A measurement system can be described as a collection of instruments or gages, standards, operations, methods, fixtures, software, personnel, environment and assumptions used to quantify a unit of measure or fix assessment to the feature characteristic being measured, and the complete process used to obtain measurements. A measurement system analysis (MSA) is a study performed on a measurement system to quantify its measurement variation and uncertainty.

Whenever a measurement is performed in support of a manufacturing or engineering process, an MSA can be performed to assure the measurement process can meet the intended need. An MSA provides a common approach to measurements used to, among other things, control manufacturing process, confirm non-technical business related metrics, evaluate design criteria, calibrate measurement processes, and validate business processes.

SUMMARY

This disclosure presents a method and system for measurement system analysis (MSA) that present a structured and effective way of performing an MSA.

In one aspect of the disclosure, a method for MSA includes determining a category of MSA for a measurement system based on an application of the measurement system, quantifying measurement variation, calculating a decision rule value based on the quantified measurement variation and a decision rule associated with the determined category, determining whether the measurement system is capable for performing MSA for the category based on a comparison of the calculated decision rule value and a decision rule threshold value, and applying a measurement system determined as capable for performing MSA to manage the quality of a manufacturing process or assist in the definition of product design.

In another aspect, a system for MSA includes a category determining module configured to determine a category of MSA for a measurement system based on an characteristic of the measurement system, an MSA measurement variation quantifying module configured to identify at least one source of measurement variation and to quantify each identified source of measurement variation, a decision rule value calculation module configured to calculate a decision rule value based on the quantified measurement variation and a decision rule associated with the determined category, a capability determination module configured to determine whether the measurement system is capable for performing MSA for the category based on a comparison of the calculated decision rule value and a decision rule threshold value, and a controller configured to apply a measurement system determined as capable for performing MSA to manage the quality of a manufacturing process or assist in the definition of product design.

DETAILED DESCRIPTION

Figure 1:
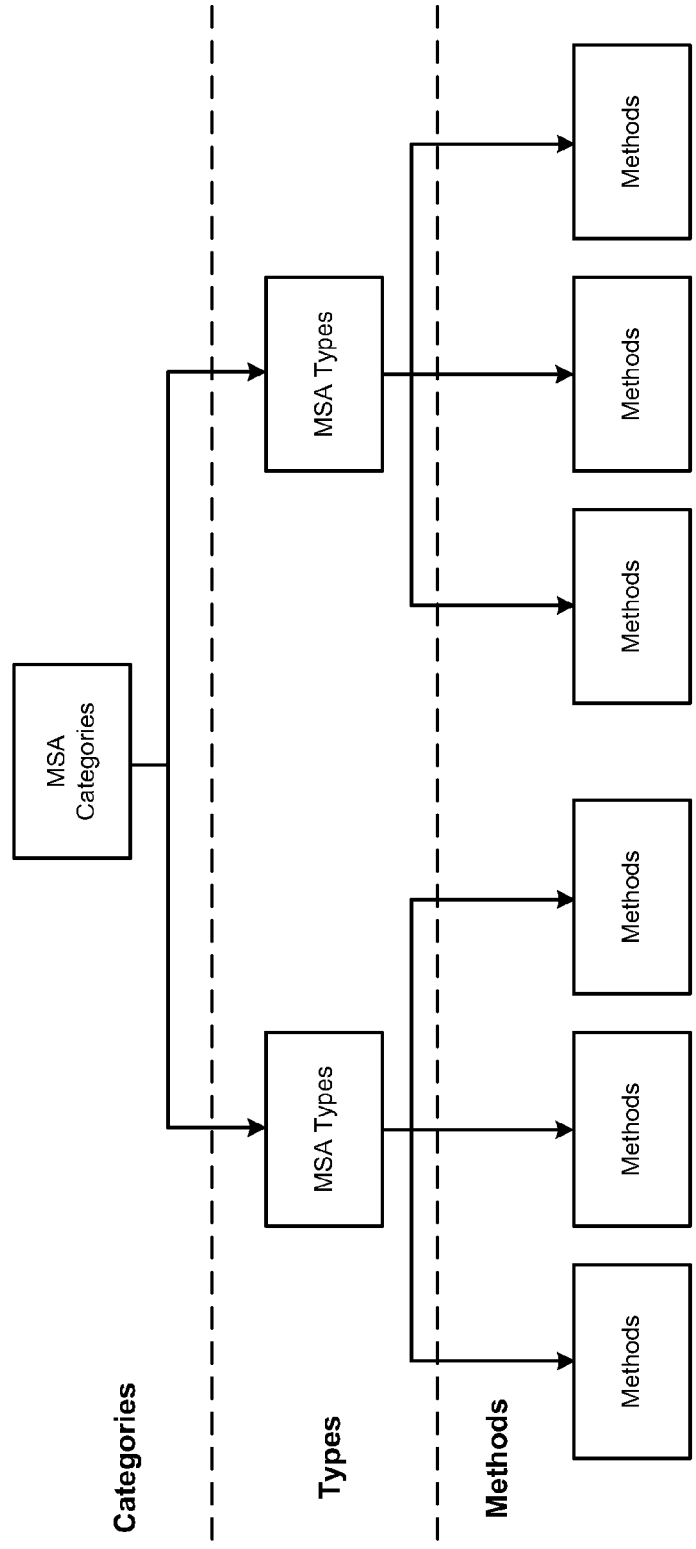
FIG. 1 is a diagram of a general measurement systems analysis (MSA) hierarchical structure in accordance with an exemplary embodiment.

Various aspects are described hereafter in connection with exemplary embodiments to facilitate an understanding of the disclosure. However, the disclosure should not be construed as being limited to these embodiments. Rather, these embodiments are provided so that the disclosure will be thorough and complete. Descriptions of well-known functions and constructions are may not be described for clarity and conciseness.

Measurement system analyses (MSAs) can be performed in various ways because there is no one defined process that can provide a guide as to how to perform the MSAs. The inventor realized that to perform an MSA properly, it is important to select efficient, practical and/or accurate methods to quantify the measurement system variation as well as understand how to apply these results in determining if the measurement process is capable.

The present disclosure provides a system and process flow for performing MSAs. Utilizing the system and following this process flow, a user is provided a path to performing an MSA, guided as to what is the best or most suited method to use for quantifying measurement variation, and directed as to how to apply these results to a decision as to whether a measurement process is capable of an intended use, and applying the determined measurement process in a manufacturing or product design application. More specifically, the system and procedure described herein divide MSAs into categories with associated decision rules, divide the sources of measurement variation into types, and also provides a guide for selecting the best MSA method to apply (e.g. a GR&R study, bias studies etc.).

The system and method described herein can reduce time generally needed to perform an MSA, provide a more consistent approach, and improve the quality of the results. As measurement systems are used in managing the quality of a manufacturing process or assist in the definition of product design, this procedure will increase the confidence in the measurement results used to making quality and design decisions.

Many aspects of this disclosure will be described in terms of actions, processes or steps to be performed by elements of a computer system or other hardware capable of executing programmed instructions. It will be recognized that in each of the embodiments consistent with the disclosure, the various actions could be performed by specialized circuits (e.g., discrete logic gates interconnected to perform a specialized function), by program instructions, such as program modules, being executed by one or more processors (e.g., a central processing unit (CPU) or microprocessor), or by a combination of both. Logic of embodiments consistent with the disclosure can be implemented with any type of appropriate hardware and/or software, with portions residing in the form of computer readable storage media with a control algorithm recorded thereon such as the executable logic and instructions disclosed herein, and can be programmed, for example, to include one or more look-up tables and/or calibration parameters. The program instructions can be stored on any non-transitory computer readable medium, which can comprise a random access memory (RAM), a read-only memory (ROM), an erasable programmable read-only memory (EPROM, EEPROM or Flash memory), an optical fiber, and a portable compact disc read-only memory (CD-ROM), or any other solid-state, magnetic, and/or optical disk medium capable of storing information. Thus, various aspects can be embodied in many different forms, and all such forms are contemplated to be consistent with this disclosure.

FIG. 1 shows an exemplary MSA model hierarchy. The MSA model is structured with three basic elements forming a hierarchical structure: (1) MSA Categories: MSAs are categorized based on the application of the measurements system being evaluated; (2) MSA Types: MSAs are described by types based on the sources of measurement variation and how the variation will be quantified; and (3) MSA Methods: MSA methods describe the experimental or empirical methods applied to the measurement system to quantify the sources of measurement variation.

Figure 2:
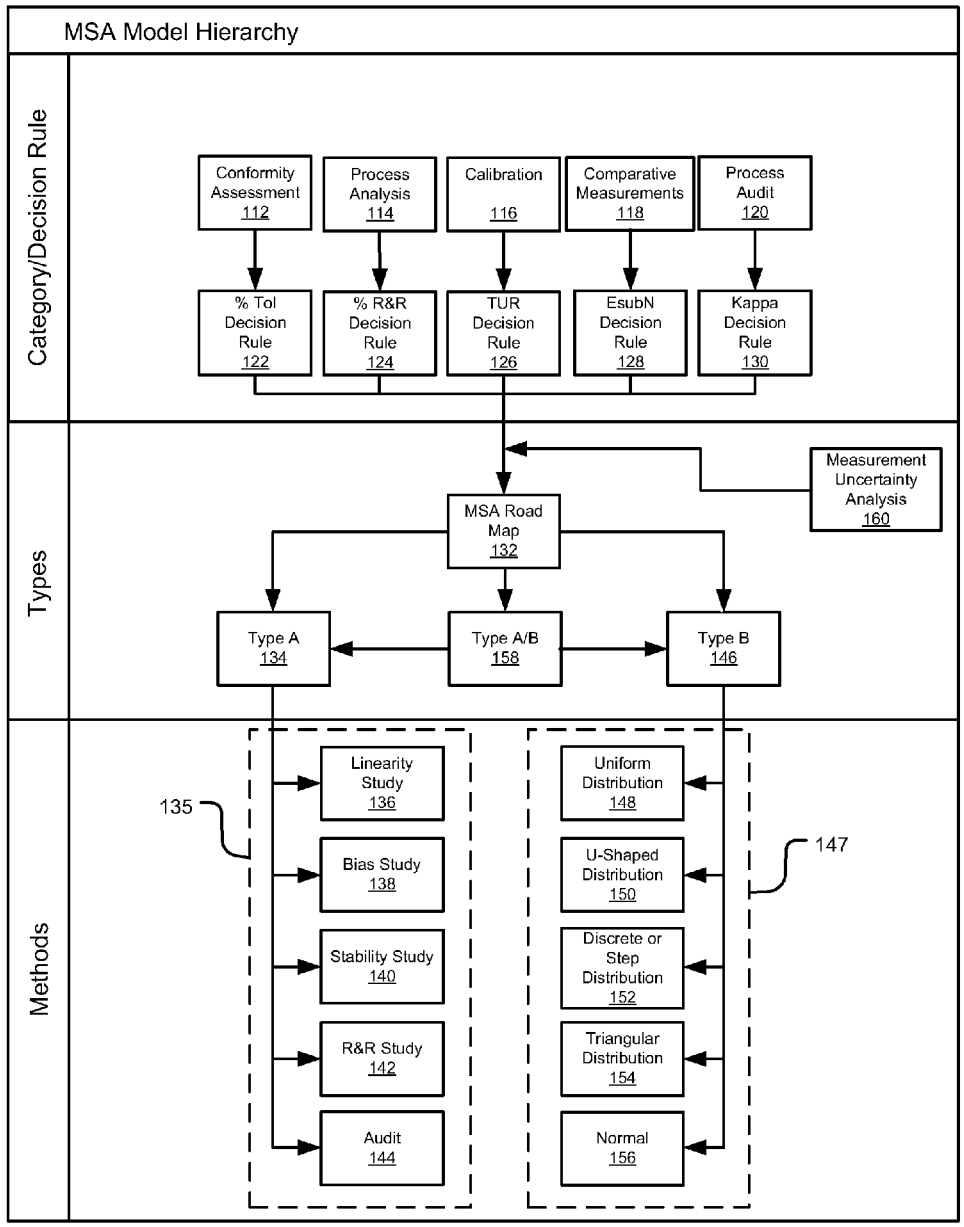
FIG. 2 is a diagram showing more details of an exemplary MSA model hierarchy according to an exemplary embodiment.

FIG. 2 shows a more detailed diagram of an exemplary MSA model hierarchy. As shown in FIG. 2, each MSA category 112-120 has an associated decision rule 122-130 with a respective decision threshold value. Each decision rule 122-130 is a rule that is applied to the result of an MSA for a category to determine whether the accuracy and precision of the measurement system is adequate for the intended use of the system. Each decision rule threshold value is the limit that is applied to the decision rule when determining whether the accuracy and precision of the measurement system is adequate for the intended use of the system. The categories of the exemplary MSA model shown in FIG. 2 include conformity assessment 112 having associated decision rule % Tol 122, process analysis 114 having associated decision rule % R&R 124, calibration 116 having associated decision rule TUR 126, comparative measurement 118 having associated decision rule EsubN 128, and process audit 120 having associated decision rule Kappa 130. These categories will be described later greater detail.

The Types and Methods partitions of the MSA model hierarchy shown in FIG. 2 are directed to an MSA road map 132, which quantifies the sources of measurement variation according to MSA Type A 134, MSA Type B 146, or Type A/B, which is a combination of Type A and Type B, utilizing methods 135 corresponding to Type A MSAs and methods 147 corresponding to Type B MSAs. The quantified sources of measurement variation are utilized by the decision rule associated with the determined MSA category to determine whether the measurement system being evaluated is capable or adequate for measuring features of the system under consideration.

Figure 3:
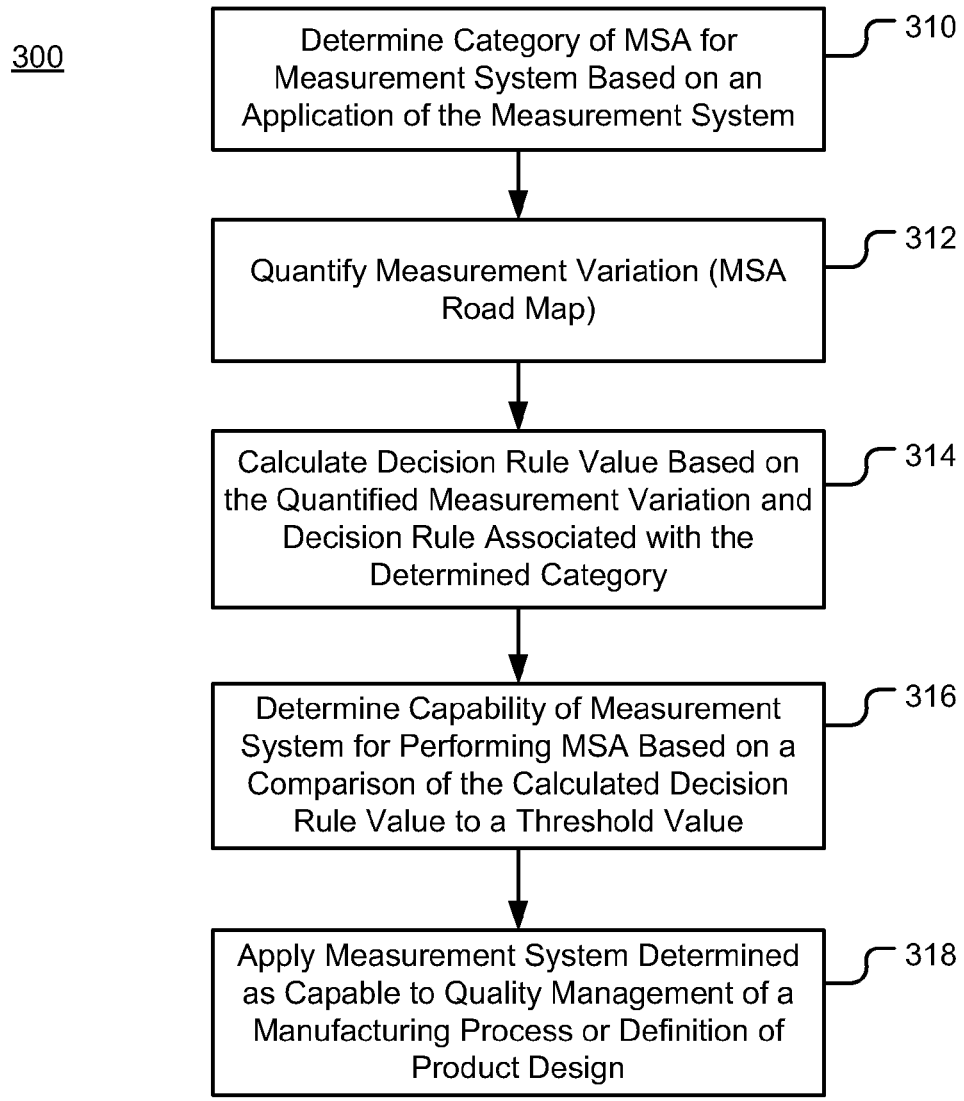
FIG. 3 is a diagram of an exemplary process that performs an MSA of a measurement system to be used to manage the quality of a manufacturing process or assist in the definition of product design.

FIG. 3 is a diagram of an exemplary process flow 300 performs a measurement systems analysis (MSA) of a measurement system to be used to manage the quality of a manufacturing process or assist in the definition of product design. Method 300 includes the process 310 of determining a category of MSA for a measurement system based on an application of the measurement system. Next, in process 312 quantifying source of measurement variation; calculating a decision rule value based on the quantified measurement variation and a decision rule associated with the determined category; determining whether the measurement system is capable for performing MSA for the category based on a comparison of the calculated decision rule value and a predetermined threshold value; and applying a measurement system determined as capable for performing MSA to manage the quality of a manufacturing process or assist in the definition of product design.

Figure 5:
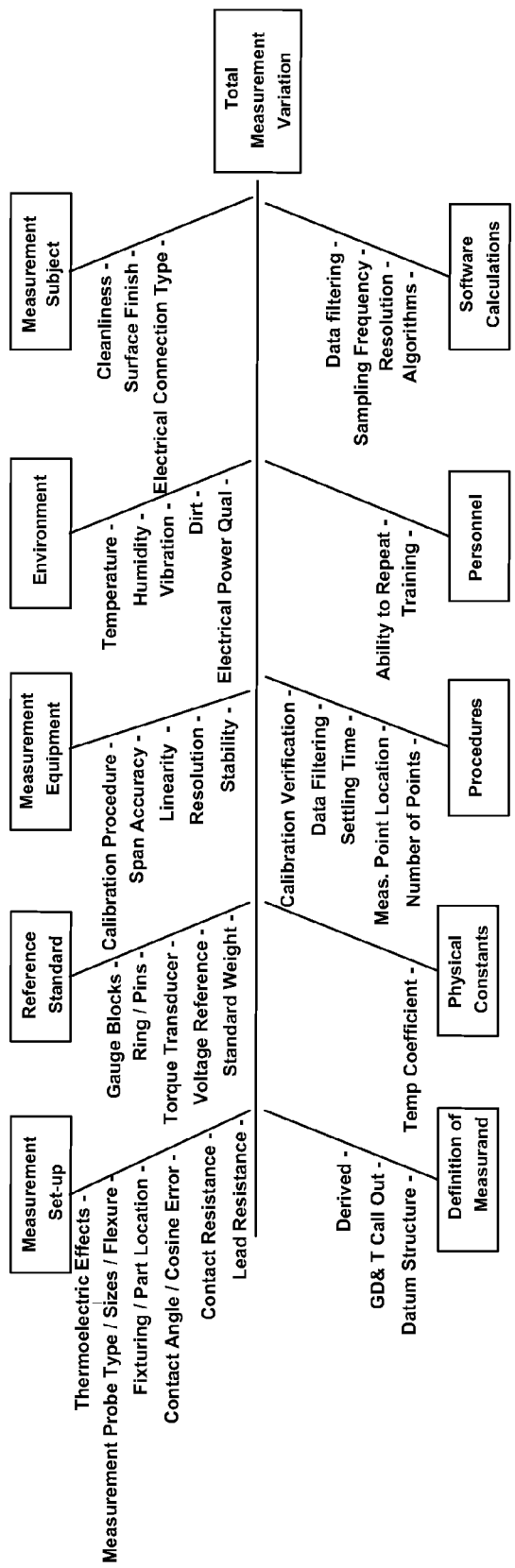
FIG. 5 shows a diagram of ten exemplary sources of measurement variation and associated sub sources of measurement variation.
Figure 6A:
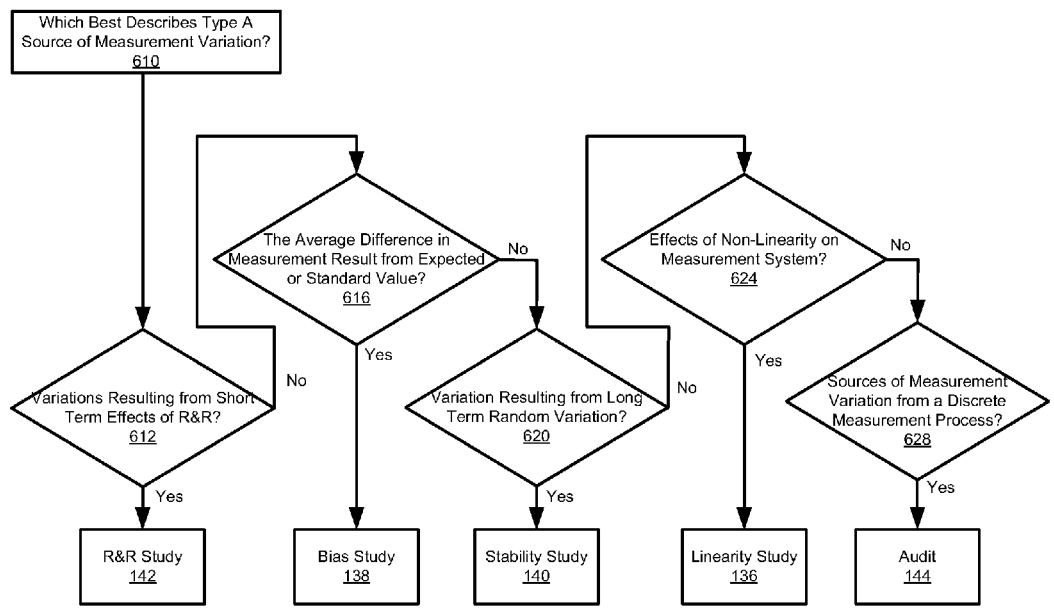
FIG. 6A is an exemplary decision diagram relating to selection of a Type A method to quantify a measurement variation.
Figure 6B:
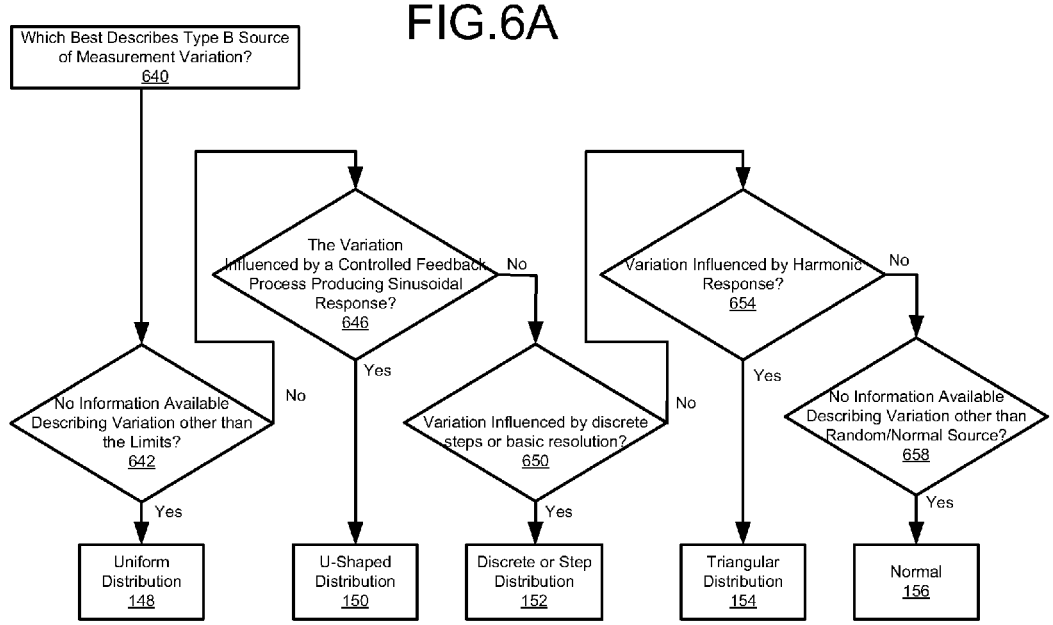
FIG. 6B is an exemplary decision diagram relating to selection of a Type B method to quantify a measurement variation of measurement variation source.
Figure 7:
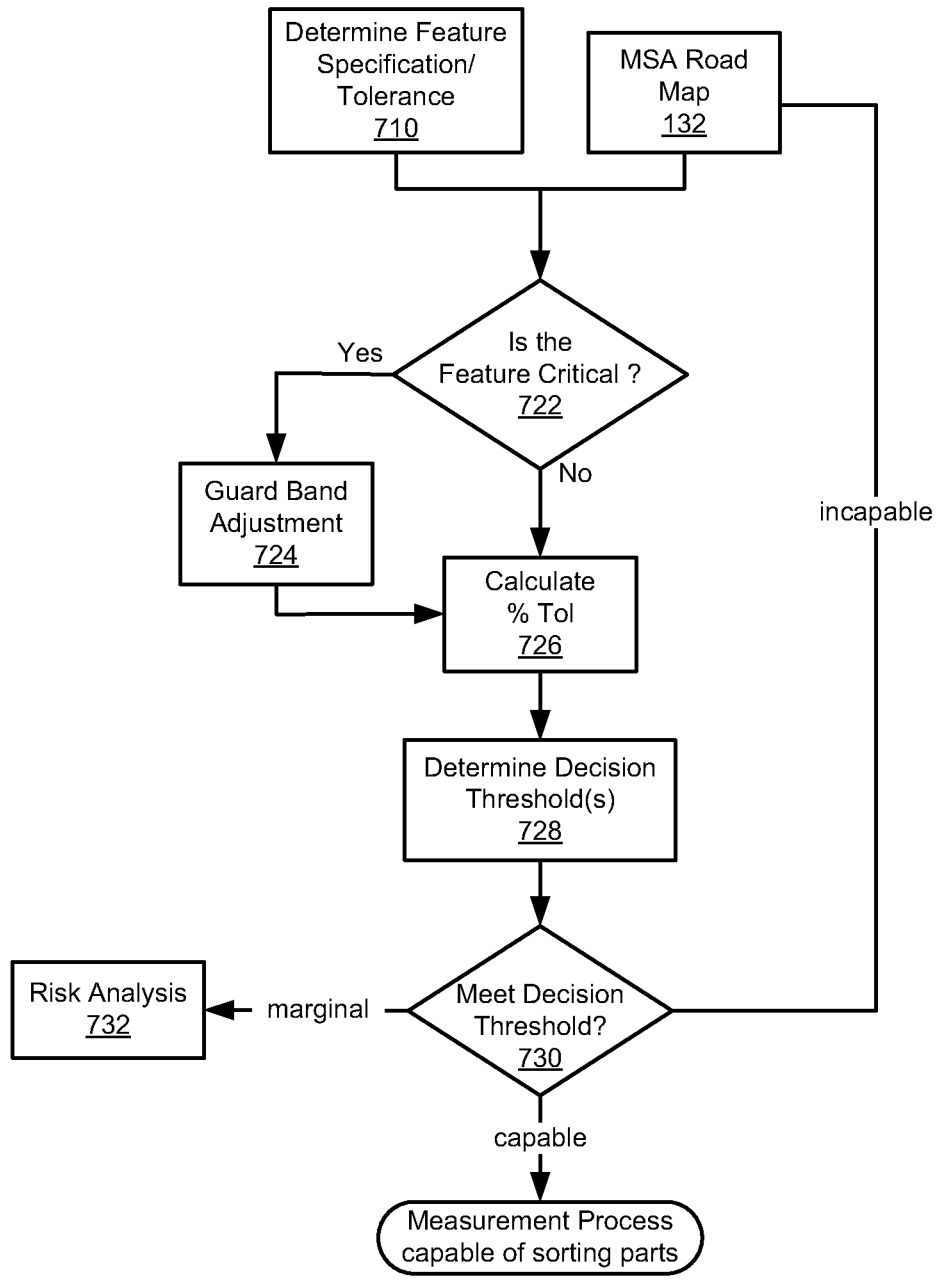
FIG. 7 is a diagram of an MSA procedure performed for a conformity assessment MSA category according to an exemplary embodiment.
Figure 8:
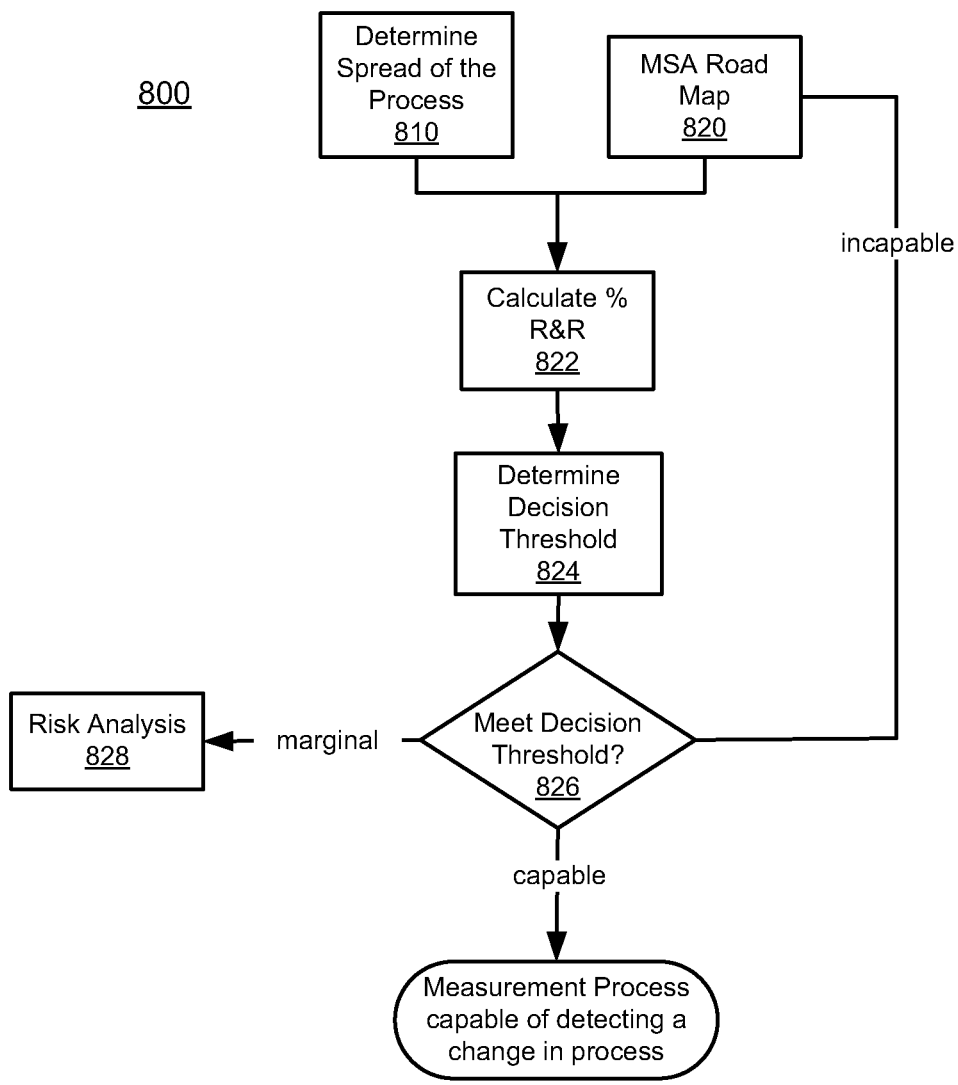
FIG. 8 is a diagram of an MSA procedure performed for a process analysis MSA category according to an exemplary embodiment.
Figure 9:
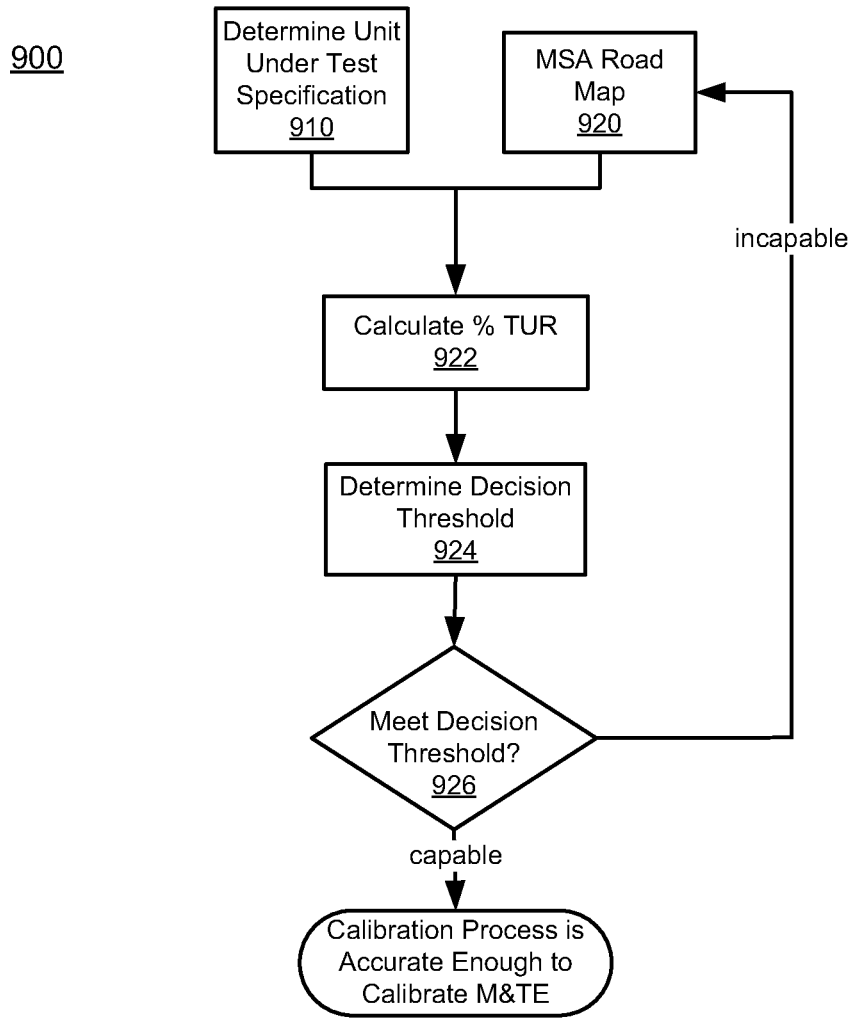
FIG. 9 is a diagram of an MSA procedure performed for a calibration MSA category according to an exemplary embodiment.
Figure 10:
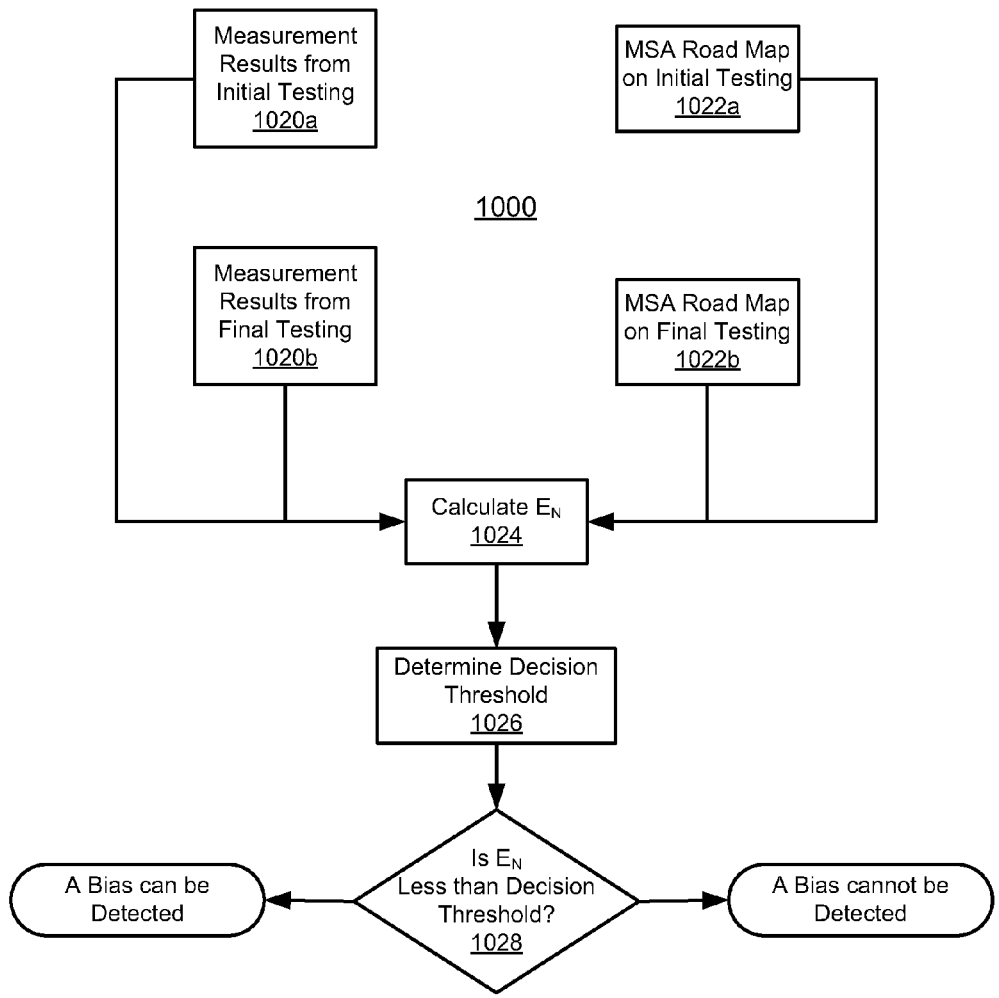
FIG. 10 is a diagram of an MSA procedure performed for a comparative measurements MSA category according to an exemplary embodiment.
Figure 11:
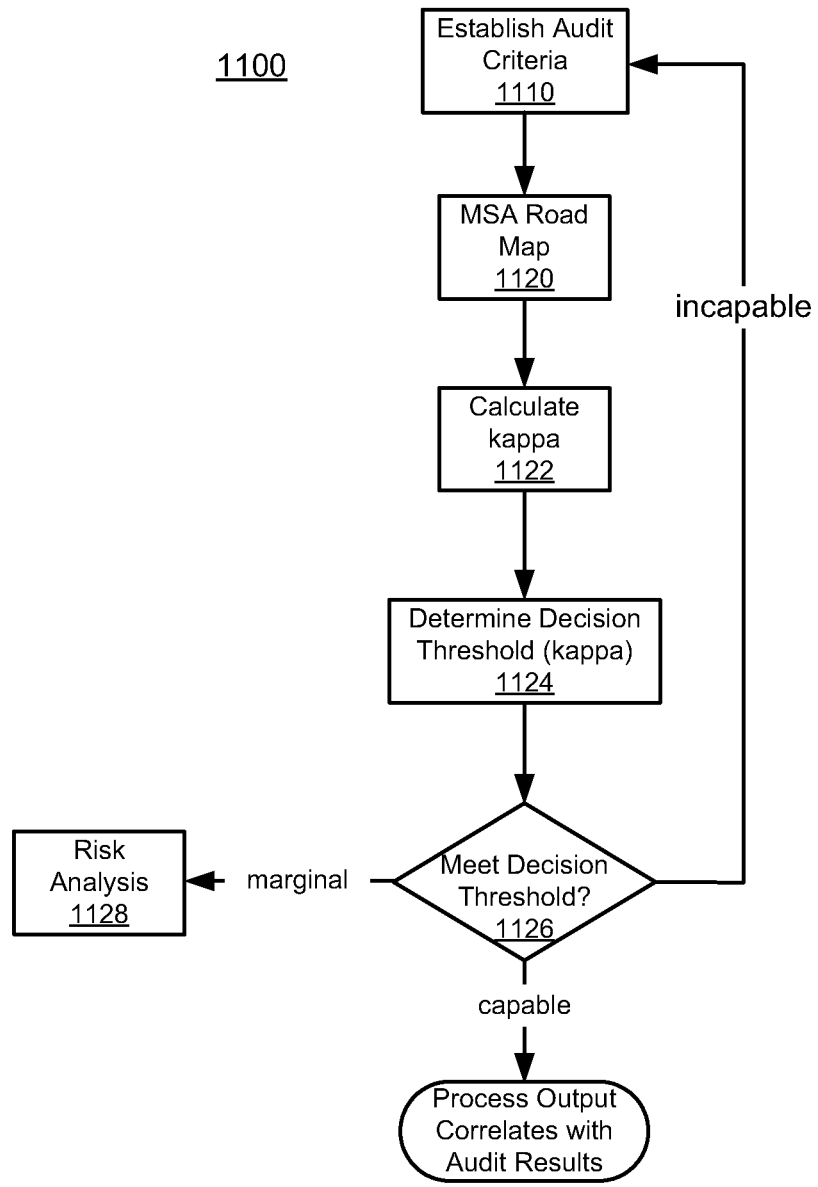
FIG. 11 is a diagram of an MSA procedure performed for a process audit MSA category according to an exemplary embodiment.

FIGS. 4-6B are diagrams showing an exemplary MSA road map 132, and each of FIGS. 7-11 is a diagram of an MSA procedure performed for a respective category and corresponding decision rule. More specifically, FIG. 7 shows an exemplary MSA procedure 700 performed for a conformity assessment MSA 112, FIG. 8 shows an exemplary MSA procedure 800 performed for a process analysis MSA 114, FIG. 9 shows an exemplary MSA procedure 900 performed for a calibration MSA 116, FIG. 10 shows an exemplary MSA procedure 1000 performed for a comparative measurements MSA 118, and FIG. 11 shows an exemplary MSA procedure 1100 performed for a process audit MSA 120. Each of the MSA procedures requires performing an MSA road map 132. While the road map 132 will first be described in detail with respect to the conformity assessment decision rule 122, its modification and application to decision rules related to the other MSA categories will readily be understood with consideration of the description herein of those decision rules.

Figure 4:
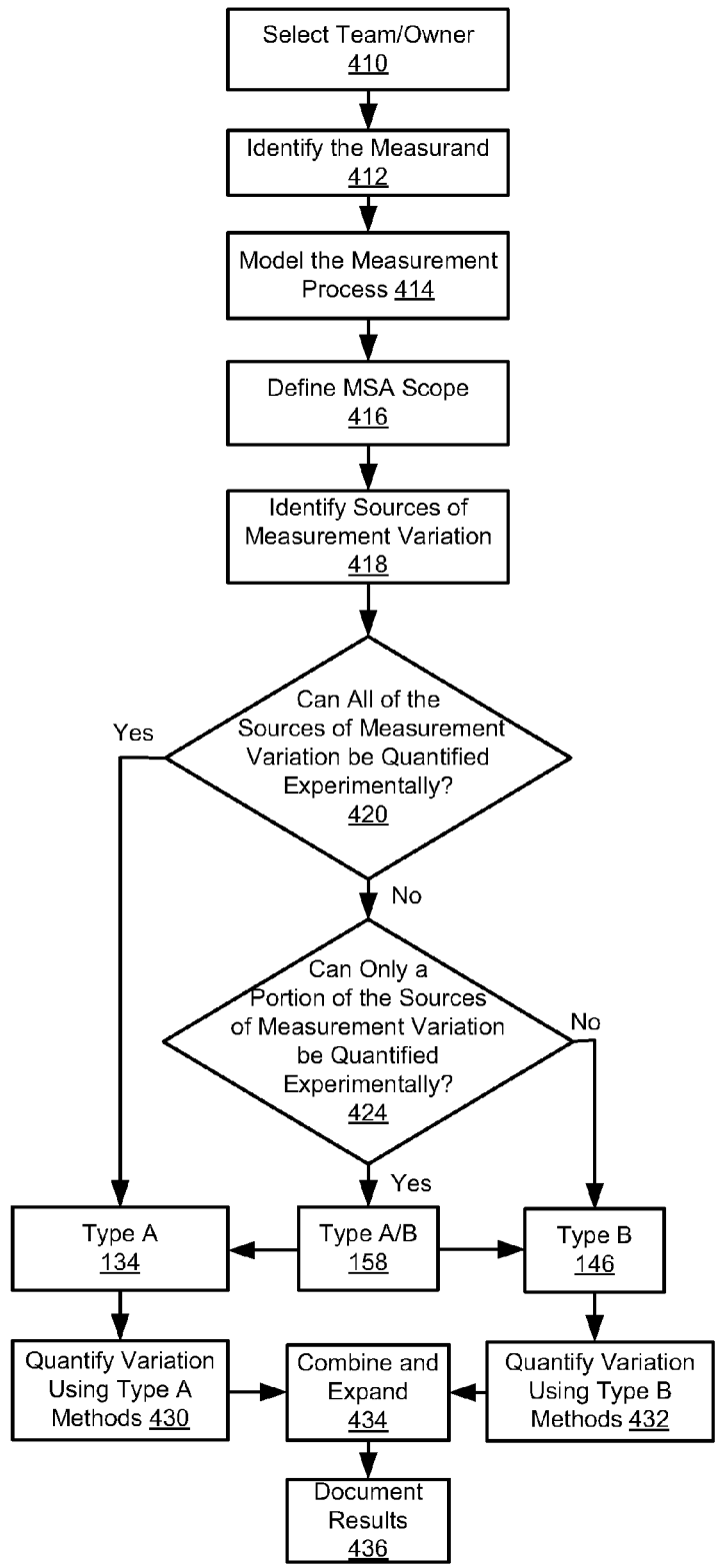
FIG. 4 is a diagram of a process flow for performing an MSA road map according to an exemplary embodiment.

The exemplary MSA road map 132 shown in FIG. 4 is described in the context of application to a conformity assessment of a feature across an appropriate range of interest. The term "range of interest," as used herein, is the range of indications across which a measurement system will be analyzed, which can vary in correspondence with the application of a measurement system and can influence how an MSA is performed. For example, a range of interest can be a product or feature specification (typical of a conformity assessment MSA), a typical process variation, and full operational range of the measurement system.

The MSA road map 132 begins at process 410 with selection of an MSA team or identification of an MSA owner. The team/owner can be identified as one who has detailed knowledge of the measurement system being evaluated, for example, application, measuring and test equipment (M&TE) used etc., and the use and application of the measurement results. In many cases, the end user of the measurement results can be designated the MSA owner. It is preferable that individuals that use or are otherwise familiar with the measurement system being evaluated be selected to assist in determining the sources of measurement variation as well as to incorporate their knowledge into the MSA design.

Next, process 412 determines the measurand including the associated units of measure. For example, embodiments can use SI units of measure, as defined in NIST SP811, as associated units of measure.

In process 414, the measurement system is modeled, accounting for traceability, discrete steps in the measurement system, significant sources of measurement variation, etc., although this process may not be necessary if the measurement system has a limited chain of traceability. In the case of complex measurement systems, modeling the measurement system can greatly assist in identifying the significant sources of measurement variation and can assist in the design or redesign of the MSA.

The scope of the MSA is established in process 416 to account for all significant sources of variation that are seen during the routine application of the measurement system. One consideration when defining the scope of the MSA is to include or not include variation introduced by the unit under test (UUT). As an example, in the case of non-destructive testing a UUT can be modified during the testing process. In this case, the scope of the MSA should include all of the variation from the measurement system, but not include the sources of variation introduced by interactions with changing features of the UUT(s). Typical examples of a UUT not being included in the MSA scope are hardness testing and engine testing.

By contrast, if a UUT is not modified during the testing process, sources of variation from interactions with the UUT can be quantified, i.e., repeatability and reproducibility. A typical example where the UUT is included in the scope of the MSA would include contact or non-contact dimensional measurements of a part.

In process 418, the sources of measurement variation are identified by evaluating all of the components of the measurements system included in the scope of the MSA. Each component of the measurement system can be evaluated against the categories of measurement variation to determine the individual potential sources. For example, FIG. 5 shows a diagram of ten exemplary sources of measurement variation and exemplary associated sub sources. It is preferable, when identifying the potential sources of measurement variation, to include any reasonable source while ignoring its relative significance to the total. This can assure that any subsequent reviewer of the MSA results also sees all potential sources of measurement variation that where considered. For example, a measurement system can be modeled and stored in a module, which can be updated and accessed when performing an MSA for that measurement system. As such, much of the MSA road map process can be automatically performed by a processing device, such as a computer system.

In decisions 420 and 424, the sources of variation are evaluated to determine the a suitable or best method of quantifying each variation source. The evaluation method for the sources of measurement variation can be "Type A" 134 in which evaluation of uncertainty can be quantified through statistical evaluation of measurement data; "Type B" 146 in which evaluation of uncertainty is the case where data cannot be derived, and Type/A/B 158 in which sources of measurement variation are quantified by combining Type A and Type B sources. The evaluation method chosen for each source of variation can form the basis of the MSA design listing any experiments or further information necessary to quantify the sources of measurement variation.

It is preferable that the measurement data and any key assumptions used to calculate the measurement variation be retained for future review. In an embodiment, these data and assumptions can be stored in memory accessible by a computer processor for future review or another MSA. The MSA types (i.e., Types A and B) are derived from an International Organization for Standardization (ISO) standard method for performing MSAs called the ISO Guide to the Expression of Uncertainty in Measurement (i.e., the "GUM"). The ISO GUM is an internationally recognized standard method for quantifying the variation in a measurement system. This is also practiced for performing a measurement uncertainty analysis (MUA) 160.

Measurement variation is categorized by the GUM based upon the source of the measurement variation. The types of measurement variation as defined by the GUM are Type A in which the sources of measurement variation are quantified experimentally using the results of repeated measurements, e.g., gage repeatability & reproducibility (GR&R)); and Type B in which the sources of measurement variation are not quantified using repeated experimental results but by other means, for example, analytical studies, empirical model, previous measurement data, general knowledge, manufactures specs, calibration uncertainties, and "engineering judgment." The present procedure follows the GUM recommendations and defines three MSA Types: Type A 134 in which the sources of measurement variation are Type A as defined in the GUM; Type B 146 in which the sources of measurement variation are Type B as defined in the Gum; and Type A/B 158 in which the sources of measurement variation are quantified by combining sources of Type A 134 and Type B 146.

As shown in FIG. 4, the result of processes 420 and 424 is a determination of one of a Type A, Type B and Type A/B evaluation of uncertainty. In processes 422 and 428, the source(s) of measurement variation are quantified based on the variation type. If decision 424 determines MSA Type A/B 158, the sources of measurement variation are parsed according to Type A 134 or Type B 146.

Next, with reference to FIGS. 2 and 4, a MSA method used to quantify the sources of measurement variation can evaluate the measurement variation across the range of interest. Each MSA type (i.e., Type A and Type B) has a series of associated MSA methods. If the sources are of Type A 134, process 430 uses one or more of the Type A methods 135 to quantify the sources of measurement variation. If the sources of are Type B 146, process 432 utilizes one or more Type B methods 147 to quantify the sources of measurement variation. For example, for Type A sources of variation, an experiment can be set up that will capture the sources of measurement variation. Design of Experiment (DoE) methods may be incorporated to assure all identified sources of measurement variation are included in the experiment.

The MSA methods 135 and 147 are the "studies" performed to quantify the sources of measurement variation. Type A MSA methods 135 are experimental studies used to statistically quantify the variation and can include linearity study 136, bias study 138, stability study 140, repeatability & reproducibility (R&R) study 142, audit 144, or other Type A MSA methods. Type B MSA methods 147 are distribution types that best describes the variation and provides a statistical estimate of the measurement variation. For example, FIG. 2 shows Type B MSA methods can include uniform distribution 148, U-shaped distribution 150, discrete or step distribution 152, triangular 154, normal 156, or other Type B MSA distribution type methods.

An exemplary R&R study 142 can include, for instance, 3 Ops, 3 Trials, and 10 Parts, which represents a special case DoE developed to assess the performance of a measurement system used to analyze a "typical" manufacturing system. To ensure the R&R study is effective in quantifying the sources of measurement variation, (1) the operator has a significant contribution to measurement variation (if the operator is believed to provide limited or no contribution to the measurement variation, multiple operators are not needed as part of the MSA design); (2) the measurement variation is consistent across the range of interest; and (3) a minimum number of data points (e.g., 30 data points) can be gathered as part of the R&R to assure valid a statistical sample. However, the R&R study method 142 is not effective when used to quantify Type B sources of measurement variation. For example, R&R studies are not effective in quantifying many sources of measurement variation seen in a typical calibration laboratory. In a calibration process, several sources of measurement variation are associated with measurement traceability, e.g., the measurement uncertainty of externally calibrated standards. These sources of measurement variation cannot be quantified experimentally.

A more detailed description of exemplary Type A methods 135 and Type B methods 147 is now provided with reference to FIGS. 6A and 6B. FIG. 6A is a decision diagram relating to selection of Type A measurement variations and FIG. 6B is a decision diagram relating to selection of Type B measurement variations, and each diagram can be used to determine which method to use to quantify a measurement variation of a respective type of measurement variation source. Although the decisions in FIGS. 6A and 6B are shown in a serial order, any order of consideration of the decisions can be applied, including any serial order or in a parallel manner.

For sources of measurement variation that are of Type A, one of the following described Type A methods 135 can be selected to experimentally quantify the variation. As shown in FIG. 6A, beginning at process 610 it is first determined at decision 612 whether measurement variation is best described as a result from short term effects of repeatability and reproducibility (R&R). If so, the R&R study 142 is selected to experimentally quantify sources of measurement variation that occur randomly in a measurement system. Quantifying sources of an R&R study 142 can include mechanical gage such as a micrometer or fixture gage, for example, where the operator can potentially have a significant impact on the total measurement variation.

An effective R&R study 142 preferably includes one or more of the following features: (1) The measurement results of the study are continuous. Continuous measurement results can be represented by data that have greater than a minimum number of distinct categories or levels (e.g., 5 distinct levels or categories). Examples of continuous measurement data include data from a dimensional gauge, mass measurement data from a scale, etc. (2) The feature/parameter of the UUT being measured does not undergo a change between measurement trials. (3) Quantification of all major sources of measurement variation through the experiment.

Samples for the R&R study 142 can be selected from within the range of interest and can be selected randomly from the normal process yield. If the study is being used for a conformity assessment MSA 112, the samples are preferably selected from across the range of interest with approximately 50% of the samples being selected within the lower 25% and the upper 75% of the range of interest whenever possible.

DoE techniques are preferably used to design the R&R study 142, accounting for the potential sources of measurement variation, number of samples available, etc. A minimum number of samples, for example 30 sample data points, are preferably collected to assure a statistically valid study. The number of distinct categories (levels) is preferably greater than a minimum value, for example, greater than or equal to 5, to assure adequate resolution. Descriptive statistics are preferably used to validate the confidence in the study's results. For example, the appraiser variation (AV), equipment variation (EV) and part-to-part variation (PV) can provide estimates of the relative magnitude of their contribution to the total measurement variation seen from the R&R study 142. It is to be appreciated that the AV, EV and PV statistics are valid only if a "traditional" R&R study have been performed, i.e., multiple appraisers and trials on the same group of samples and the samples do not change during the study.

In decision 616, if it is determined that the source of variation is best described as an average difference in the measurement result from expected or standard value, bias study 138 is performed to quantify the magnitude and direction of systematic error that exist in the measurement result.

For an effective bias study 138, the study preferably includes one or more of the following features: (1) continuous measurement results; (2) bias study samples selected from within the range of interest; (3) bias study samples resembling the "typical" characteristics, size, etc. of the measurement feature being evaluated by the measurement systems (e.g., calibrated part, where the feature being inspected is independently calibrated and assigned a value of known measurement uncertainty); (4) a minimum number of sample data points (e.g., 30 sample data points) collected to assure a statistically valid study; (5) samples that have an independently calibrated value with a measurement uncertainty of less than a threshold value representing a part of the total measurement variation of the measurement system being evaluated (e.g., less than 25% of the total measurement variation), where "independently calibrated" implies the study sample's calibrated values is assigned independently of the measurement system being studied (i.e., the calibrated value assigned to the study sample cannot be derived from the measurement system itself); and (6) the measurement variation resulting from the repeatability of the bias study is less than a threshold value representing a part of the total measurement variation of the measurement system being evaluated (e.g., less than 10% of the total measurement variation).

In decision 620, if it is determined that the source of variation is best described as a variation resulting from long term random variation, a stability study 140 can be performed to quantify magnitude and direction of drift in the measurement system over time.

For an effective stability study 140, the study preferably includes one or more of the following features: (1) continuous measurement results; (2) stability samples that are selected from within the range of interest; (3) stability study sample(s) resembling the "typical" characteristics; size, etc. of the measurement feature being evaluated by the measurement system; (4) measurement sample(s) that have their stability over time independently verified to have a drift rate representing less than a maximum predetermined percentage of the total measurement variation of the measurement system being evaluated (e.g., a drift rate less than 10% of the total measurement variation); (5) each drift point consisting of the average of a minimum number of individual measurement results (e.g., an average of 10 results); (6) a minimum number of drift points (e.g., at least 5 drift points) collected to assure a statistically valid study; (7) a measurement variation resulting from the R&R of each drift point less than a maximum predetermined percentage of the total measurement variation of the measurement system being evaluated (e.g., a measurement variation from the R&R of each drift point less than 10% of the total measurement variation); and (8) drift points collected across a period of time representing one calibration interval.

It is to be appreciated that it is not required that the samples used for the stability study 140 are calibrated, as their primary function is evaluating long term stability of the measurement system and not its traceability. Additionally, "independently verified" implies the study's samples are assigned a drift rate independently of the measurement system being studied (i.e., the drift rate assigned to the study sample cannot be derived from the measurement system itself).

Decision 624 determines whether the source of variation is best described as effects of non-linearity on the measurement system. If it is, a linearity study 136 is performed to quantify the magnitude and direction of measurement bias seen across a measurement instrument's scale within the range of interest.

For an effective stability study 136, the study preferably includes one or more of the following features: (1) continuous measurement results; (2) linearity points collected from across the range of interest, while accounting for as much of the range of interest as possible; (3) study samples resembling "typical" characteristics; size, etc. of the measurement feature being evaluated by the measurement systems (e.g., calibrated part, where the feature being inspected is independently calibrated and assigned a calibrated value of know measurement uncertainty); (4) each linearity point consisting of the average of a minimum of 10 individual measurement points; (5) measurement variation resulting from the R&R of the linearity point less than a maximum predetermined percentage of the total measurement variation of the measurement system being evaluated (e.g., measurement variation of less than 10% of the total measurement variation); (6) collected data from a minimum number of calibrated linearity points (e.g., a minimum of 5 linearity points); and (7) linearity study samples having an independently calibrated value with a measurement uncertainty of less than a predetermined percentage of the total measurement variation of the measurement system being evaluated (e.g., less than 25% of the total measurement variation).

If the source of variation is best described as being from a discrete measurement process, an audit study 144 is performed to experimentally quantify the R&R of an audit performed on a process.

An effective audit study 144 preferably includes one or more of the following features: (1) discrete measurement results; (2) at least 2 operators and 2 trials; (3) a minimum of 10 audit samples; (4) the samples of the audit are stable across trials and operators; and (5) the audit samples are selected randomly from the normal process yield.

In an audit study 144, descriptive statistics are preferably used to validate the confidence in the study's results, such as (1) an inter-rater agreement greater than 0.4 Kappa (Fleiss); (2) % agreement between operators greater than 75% at a 95% confidence interval; and (3) the effectiveness of an operator when comparing their audit results against a set of independently verified reference audit results having an effectiveness greater than a predetermined high percentage value, for example, greater than 95%, although effectiveness greater than about 80% can be acceptable but can indicate the operators needs to improve. "Effectiveness" is equal to the number of correct decisions/total opportunities for a decision. This statistic provides an indication of the operator's effectiveness or bias when auditing a set of reference audit results. "Independently verified" implies there has been an audit of a sample whereby the results of the audit where derived independently of the measurement system being studied (i.e., the reference audit results cannot be derived from the measurement system being studied).

For sources of measurement variation that are of Type B, one of the following described Type B methods 147 is selected to experimentally quantify the variation. As shown in FIG. 6B, beginning at process 640 it is first determined at decision 642 whether measurement variation is best described as no information being available describing the measurement system's variation other than the limits. If so, a uniform distribution study 148 can be performed to provide an estimate of measurement variation where no information is available about the nature of the measurement variation and only the limits of the variation are available. The measurement variation resulting from a uniform distribution can be quantified by multiplying ½ of the range of the limit of the measurement error by 0.58, providing a 1 sigma estimate of the measurement variation. Typical sources of measurement variation described by a uniform distribution include calibration uncertainties, M&TE specifications across a defined environmental range, results of previous MSA studies where only the results of the study are available, etc.

Decision 646 determines whether the Type B source of measurement variation is best described as the variation influenced by a controlled feedback process producing a sinusoidal response. If so, the U-shaped distribution study 150 can be performed to provide an estimate of measurement variation where the response of the measurement system is directly influenced by a controller feedback process and causes the measurement variation to have a sign wave response.

The measurement variation resulting from a U-shaped distribution can be quantified by multiplying ½ of the range of the limit of the measurement error by 0.71, providing a 1 sigma estimate of the measurement variation. Typical sources of measurement variation described by a U-shaped distribution include temperate effects on the measurement system where the measurement is controlled to a set point or other environmental influences on the measurement system where there is a feedback control providing a cyclic response.

Decision 650 determines whether the Type B source of measurement variation is best described as a variation influenced by discrete steps or basic resolution. If so, a discrete or step distribution study 152 can be performed, which provides an estimate of measurement variation resulting from the basic or most discrete resolution of the measurement system.

The measurement variation resulting from a step distribution can be quantified by multiplying most discrete step in the resolution of the measurement system by 0.29, providing a 1 sigma estimate of the measurement variation. Exemplary sources of measurement variation described by a step distribution include least discernible resolution of a digital or analog scale, digital resolution of an A/D converter etc.

Decision 654 determines whether the Type B source of measurement system variation is best described as being from a variation influenced by harmonic response. If it is, a triangular distribution study 154 is performed, which provides an estimate of measurement variation where the response of the measurement system is directly influenced by a harmonic response.

The measurement variation resulting from a triangular distribution can be quantified by multiplying ½ of the range of the limit of the measurement error by 0.41 and providing a 1 sigma estimate of the measurement variation. Exemplary sources of measurement variation that can be described by a triangular distribution 154 include vibration effects in which the measurement system is influenced by the primary vibration frequency as well as the harmonics.

Next, decision 658 determines whether the Type B source of measurement system variation is best described as being one for which no information is available describing the measurement system variation other than that it is a random/normal source.

Referring again to FIG. 4, the combine and expand process 434 is performed if there are multiple methods used to quantify the sources of measurement variation. The total measurement variation (measurement uncertainty) can be calculated as follows: (1) the results of the individual methods (sources of uncertainty) can be combined (i.e., combined uncertainty) using the root sum square method, accounting for the individual sensitivity coefficients for each result; (2) the total measurement variation can take the combined results (i.e., the combined uncertainty) and expand it by the appropriate confidence interval (i.e., expanded uncertainty) accounting for the effective degrees of freedom (the effective degrees of freedom can be calculated using the Welch-Satterthwaite calculation); and (3) the expansion coefficient can be determined by using the Student T distribution accounting for the effective degrees of freedom over the appropriate confidence interval, where the confidence interval can be selected to assure consistency with the confidence interval of the tolerance/variation applied to the total measurement variation (expanded uncertainty) in the decision rule.

The terminology used by the GUM for the combined result is the combined measurement uncertainty (u) and for the final result is the expanded measurement uncertainty (U).

The 95% confidence interval described above is a de facto standard used in most of the world when reporting the results of a calibration process.

It is preferable that when applying a decision rule, the expanded measurement uncertainty is over the same confidence interval as the quantity being compared. For example, if the MSA category is process analysis and the process variation is reported over a 99.73%, or 3 sigma confidence interval, and then the expanded measurement uncertainty can be expanded by 99.73% rather than the de facto 95% to assure the ratio of decision rule results are accurate.

Thus, in process 434 the results of the Type A and Type B methods are combined and expanded where suitable, and the results are documented in process 436, for example, saved in memory for later retrieval.

The MSA road map shown in FIGS. 4-6B also can be performed when a measurement uncertainty analysis 160 (see, FIG. 2) is an intended result, e.g., a final result, of an MSA.

FIG. 7 is a diagram of procedure 700 used to perform an MSA for conformity assessment category 112 utilizes the % Tol MSA decision rule 122. The conformity assessment category 112 is an MSA category that applies when a measurement system is used to evaluate a product or process against a specification or tolerance. For example, the conformity assessment MSA can be used to determine whether a measurement system is capable of detecting a defective or substandard manufacture, such as a bad part. In this category, performing a conformity assessment MSA determines whether a measurement system is capable of testing a feature. The associated % Tol decision rule 122 of the conformity assessment category 112 calculates the ratio of expanded measurement systems variation to part/process tolerance, and based on at least one threshold value, determines whether a measurement process under consideration is capable of determining whether a feature complies to a specification. In an exemplary embodiment, more than one threshold value can be used to determine different degrees of conformity, for example, whether the measurement system is capable, marginally capable, or incapable of determining compliance.

The procedure 700 begins with process 710, which determines the specification or tolerance of the feature being evaluated by a measurement system under consideration. Additionally, the MSA road map 132 is performed on the measurement system. Next, decision 722 determines whether the feature to be measured (i.e., the measurand) is identified as critical, for example, features that are related to product safety or that can result in a complete product system failure if they do not meet specifications. If they are determined to be critical, the "yes" path is taken to process 724 in which guard band adjustment is made to assure 100% compliance to specification. Guard band adjustment, or guard banding is a practice of adjusting a features specification limit assuring 100% conformance to specification. In a guard band adjustment, the specification limit can be reduced by the measurement system variation or uncertainty to establish a new specification limit on which to base compliance decisions. When performing the guard band adjustment process 724, the total measurement variation is subtracted from the specification limits for the critical feature to form a new pass/fail limit. This can assure that any variation in the measurement system will not result in a feature that does not meet specification 100% of the time. Guard banding is preferably used when only when absolutely necessary, as it can significantly increase producer scrap. Guard banding sets a decision rule where the tolerance is reduced by the guard band to establish a new acceptance and rejection limit. In an embodiment, a guard band can be calculated using the following equation:

$$g = hU \quad (1)$$

where h=guard band multiplier, U=expanded uncertainty. Tables can be used to calculate a guard band multiplier (h) based on the desired probability of a part falling within tolerance (conformance probability).

If decision 722 determines the feature is not critical or after performing guard band adjustment 724, the % Tol is calculated in process 726. The % Tol calculation, which is part of the decision rule for the MSA conformity assessment 112 and can also be referred to as % P/T (percent precision to tolerance ratio), is used in a conformity assessment MSA to determine if the measurement system is capable of determining feature compliance to specification. % Tol can be calculated as follows:

$$\% \, Tol = 100\% * \left[\frac{MU}{Tol}\right] \quad (2)$$

where MU is total measurement variation resulting from all sources of measurement variation, type A and type B, expanded to a 99.73% confidence interval or ±3σ for infinite degrees of freedom, and "Tol" is the tolerance of the feature being tested.

In process 728, an associated decision rule threshold value is determined. The decision rule threshold value can be a predetermined value stored in a physical memory accessible by a processor or user performing the decision 730, which determines whether the % Tol calculated in process 726 meets the decision threshold value. In an exemplary embodiment, two threshold values are determined and stored: a marginal threshold value $Th_m$ and a capable threshold value $Th_c$. For example, with $Th_m$=30% and $Th_c$=10%, decision 730 would decide the measurement system currently under consideration having a calculated % Tol value less than 30% as marginal, and a calculated % Tol value less than 10% as capable.

If the % Tol decision rule threshold indicates capable, i.e., the % Tol meets the predetermined $Th_c$ decision threshold, then the measurement system may be used to determining feature compliance to specification.

If the calculated % Tol value is within a marginal range defined by the predetermined threshold(s) (e.g., between $Th_c$ and $Th_m$), then the measurement system can be used to determine acceptable feature compliance to specification if one or more predetermined condition is met. For example, an embodiment can be configured such if a calculated % Tol is marginal, the measurement system can be determined acceptable for feature compliance to specification if the following is performed: (1) a risk analyses 732 to quantify the customer's risks; (2) the MSA customer agrees to any increased risk and the records of the MSA customer's acceptance maintained; and (3) the feature's audit frequency reviewed and adjusted, as appropriate, to account for the increased customer risk.

An exemplary risk analysis 732 for the conformity assessment MSA 112 can use the following equations derived from ASME B89.7.4.1-2005. The term "measurement uncertainty" is equivalent to the results of the Type A, Type B or Type A/B MSA as performed under the MSA road map 132. Where the term "standard uncertainty" is used, this is equivalent to the MSA result at a 67% or 1 sigma confidence. In the case of the term "expanded uncertainty" it is assume the MSA result expanded to a 95% or 2 sigma confidence interval.

The risk assessment calculation begins with a calculation of the acceptance zone based on a conformance probability of a part falling within tolerance begins with the calculation of measurement capability index:

$$C_m = \frac{T}{4u_m} \quad (3)$$

where T (Tolerance)=$T_U$-$T_L$, $T_U$=upper tolerance limit, $T_L$=lower tolerance limit, and $u_m$=standard uncertainty (k=1 or unexpanded uncertainty). Next, the scaled measurement value is calculated, as follows:

$$\hat{x} = \frac{(x_m - T_L)}{T} \quad (4)$$

where $x_m$=measured value. Using the calculated $C_m$ and $\hat{x}$ values, a reference can be made to ASME B89.7.4.1-2005, which describes how the desired level of confidence is used to define the acceptance zone.

If the % Tol decision rule calculation does not meet the marginal level (i.e., does not meet the $Th_c$ and the $Th_m$ thresholds), then decision 730 determines the measurement system is incapable of determining whether the feature meets compliance or has acceptable compliance to specification. If the measurement system is determined incapable, then one or both of the following can be performed: (1) the conformity assessment MSA is performed again via an adjusted road map 132, considering changes in the measurement system's application, design etc. that may have introduced excessive measurement variation; and (2) the feature's specification is reviewed (e.g., reviewed with the customer) to determine whether adjustments can be applied to assure the measurement system is capable or marginally capable of determining compliance to specification. Any changes to feature specification are preferably agreed upon by the customer and records of the customer's acceptance maintained. Processes 722-730 can be repeated with adjustment(s) made to the road map 132 in each repetition until a capable or acceptably marginal measurement process is determined. An MSA found capable or marginal, but acceptable can then be applied, for example, as a measurement system to manage the quality of a manufacturing process (e.g., identification of a bad part), assist in the definition of product design.

If the measurement system is being used to control a process (e.g., to detect a change in a performed process), an MSA according to a process analysis MSA category 114 can be performed to determine whether the measurement system is capable of controlling the process. FIG. 8 is a diagram of an exemplary process 800 for carrying out an MSA for a process analysis MSA category 114, which utilizes the % R&R decision rule 124 for determining whether the accuracy and precision of a measurement system is adequate for process control.

As shown in FIG. 8, process 800 begins at process 810, where the data spread of the process is determined by the measurement system under evaluation under normal operating conditions. For example, process 810 can determine the 6 sigma spread of the process population under typical operating conditions. Additionally, process 820 performs an MSA road map on the measurement system as it would typically be used for process analysis, across the appropriate range of interest (see, FIG. 4 and related description, above). In the case of a process analysis MSA, the range of interest is the typical spread of the population being monitored by the measurement system (e.g., the 6 sigma spread of the population).

Next, process 822 calculates the ratio of the measurement variation to process variation, % R&R. In an embodiment, % R&R is calculated as follows:

$$\% \, R\&R = 100\% * \left[\frac{GRR}{TV}\right] \quad (5)$$

where GRR is the total measurement variation of an R&R study excluding the part-to-part variation, and expanded to 99.73% confidence interval or +/- three standard deviations for finite degrees of freedom, and TV is total variation of an R&R study including part-to-part, process, MT&E, operator etc. expanded to a 99.97% confidence interval, although other limits can be used for a preferred degree of confidence.

Next, process 824 determines one or more decision thresholds (e.g., from a lookup table stored in from memory or otherwise obtained) and compares the threshold(s) with the calculated % R&R value. For example, for threshold values of 10% and 30%, a calculated % R&R value less than a threshold value of 10% can indicate that the measurement system is capable of detecting a change in the process, a calculated % R&R value between 10% and 30% can indicate that the measurement system is marginally capable of detecting a change in the process, and a calculated % R&R value of 30% or greater can indicate that the measurement system is incapable of detecting a change in the process.

At decision 826, if the % R&R decision rule threshold indicates the measurement system is capable, then the measurement system may be used for process control. If the % R&R decision rule threshold indicates the measurement system is marginally capable, then the measurement system may be used for process control if a risk analysis 828 is performed and the determined risk is acceptable to the MSA owner, MSA customer or other party. For example, a risk analyses 828 can be performed to quantify a customer's risks; the MSA customer can agree to any increased risk and the records of the MSA customer's acceptance maintained; and the feature's audit frequency reviewed and adjusted, as appropriate, to account for the increased customer risk.

For example, an embodiment can include a risk analysis for a process analysis MSA can Refer to Appendix B of the AIAG MSA Handbook Rev. 4 to determine actual process capability, where the observed process capability is calculated based on the total variation of an R&R study including part-to-part, process, M&TE, operator etc. expanded to a 99.73% confidence internal or ±3σ for infinite degrees of freedom. The total measurement variation is the results of an R&R study, excluding the part-to-part variation, expanded to a 99.73% confidence internal or ±3σ for infinite degrees of freedom.

Measurement capability can also influence process capability. Using the measurement capability index ($C_m$, as calculated above) and the guard band (g, as calculated above) reference can be made to B89.7.3.1-2005 to calculate the producer's and consumer's risk for a given process capability Cp.

If the % R &R decision rule threshold (e.g., $Th_c$ and $Th_m$) does not meet the marginal level, then the measurement system is incapable of detecting changes in the process. If the measurement system is incapable, the process analysis MSA can be performed again via an adjusted road map 820, considering changes in the measurement system's application, design etc. that may have introduced excessive measurement variation. See, the above road map description.

If a measurement system is being used to calibrate a UUT, i.e., the specification of the M&TE being calibrated, then a calibration MSA 116 can be performed to determine whether the measurement system is capable of performing the calibration (e.g., whether the calibration process is sufficiently accurate). The calibration MSA 116 has an associated TUR decision rule 126 for determining whether the accuracy and precision of a calibration process is adequate to calibrate the UUT.

FIG. 9 is a diagram of an exemplary process 900 for carrying out the TUR decision rule 126. With reference to FIG. 9, process 910 determines the appropriate range of interest. In general, the range of interest can apply across the entire specification of the UUT, although in some embodiments and instances the UUT can be used across only a portion of its usable range and/or function. In these instances, the range of interest can be the UUT's range and/or function of normal use.

Additionally, the MSA road map is performed, in process 920, on the measurement system as it would typically be used to perform the calibration of the UUT, across the range of interest (see, FIG. 4 and related description, above).

In process 922, the % TUR value is calculated to determine if the measurement system is capable of performing the calibration. The calculation determines the ratio of calibration uncertainty to specification of the UUT, i.e., $$U_c:UUT \qquad (6)$$

where $U_c$ is the measurement uncertainty of the calibration process expanded to a 95% confidence interval or ±two standard deviations (2σ) for infinite degrees of freedom.

In process 924, the calibration decision rule threshold is determined, for example, by looking up the threshold in memory. In an exemplary embodiment, the $U_c$: UUT threshold value is preferably 4:1, although the threshold can be set to a different value. Next, decision 926 determines whether the calculated % TUR meets the threshold value. If the MSA result meets the decision rule threshold then the calibration system or process is capable of calibrating M&TE.

If the TUR decision rule 126 does not meet the capable level, the measurement system is considered incapable of performing the calibration. If the measurement system is incapable, then one or more of the following can be performed: (1) an MSA is performed on the UUT to determine the impact of the reduced accuracy in the UUT's normal application; (2) the MSA customer can agree to the decreased accuracy of the UUT and the records of the MSA customer's acceptance maintained; and (3) if the MSA results are determined to be of unacceptable risk to the MSA customer, then the calibration capability MSA 116 is performed again via the road map 920, with consideration of changes in the measurement system that may have introduced excessive measurement variation.

The comparative measurements category 118 is an MSA category that applies when comparing the results of multiple measurements to determine whether a bias can be detected between them For example, the MSA comparative measurements category 118 can be performed in a situation in which a determination is needed as to whether a measurement system can detect a change in product performance before and after a design change. The comparative measurements MSA category 118 has an associated $E_N$ (E sub Normal) decision rule 128 for determining whether a bias between measurement results can be detected.

FIG. 10 is a diagram of an exemplary process 1000 for carrying out the $E_N$ decision rule 126. As shown in FIG. 10, process 1000 begins with process 1020a, which determines the measurement result of an initial measurement. Additionally, the range of interest of the measurement system is determined. The range of interest can cover the potential change in the measurement result from initial to final measurement. If the change in the measurement results between the initial and final measurements cannot be estimated, then the range of interest can cover the entire range of measurement system. Also, MSA road map process 1022a is performed an on the measurement system as it is applied in the initial measurement.

In process 1020b, the measurement result for the final measurement is determined, and in process 1022b an MSA road map is performed on the measurement system as it is applied in the final measurement. In some instances, the MSA road map of process 1022a performed on the initial measurement will have accounted for all of the sources of measurement variation that apply to the final measurement. In such an instance, the MSA road map results derived from the initial measurement can be applied to the final measurement and performing a new or additional MSA road map on the final measurement is not necessary.

In process 1024, the $E_N$ (E sub Normal) decision rules is used for comparative measurements MSAs to determine whether a bias can be detected between the initial and final measurement results. The $E_N$ is the ratio of bias between two measurement results to the combined measurement uncertainty of both measurement results, and can be calculated as follows:

$$E_N = \frac{|x_A - x_B|}{\sqrt{U_A^2 - U_B^2}} \qquad (7)$$

where $X_A$ and $X_B$ are average measurement results of two respective measurements, e.g., measurement results of test A and test B, and $U_A$ and $U_B$ represent measurement uncertainty of two respective measurements each expanded to a 95% confidence interval or two standard deviations (2σ) for infinite degrees of freedom.

In an embodiment, the T Test may be used in replacement of the $E_N$ metric. When the $E_N$ statistic is used to evaluate the results of an inter laboratory comparison (ILC), then it can be used to establish if the measurement results of the respective measurement systems are correlated.

In process 1026, a threshold value for the $E_N$ decision rule 128 is determined. For example, the threshold value can be a predetermined value stored in, and retrieved from memory. Next, decision 1028 compares calculated $E_N$ value with the decision threshold to determine whether a bias can be detected between the initial and final measurement results from processes 1020a and 1020b. In an embodiment, if the calculated $E_N$ value is less than 1.0, the measurement system is considered incapable of detecting bias between the initial and final measurement results if the measurement systems analyzed are not intended to have a bias between them. If the calculated $E_N$ value is greater than or equal to 1.0, the measurement system is considered capable if the measurement systems are intended to detect a bias between the initial and final measurement results.

In the case of comparative measurements MSAs 118, there will be instances where the desired outcome of the $E_N$ decision rule 128 will either be greater than or less then the decision rule threshold, i.e., there are instances when it is necessary to determine if you can see a bias between two measurements or a bias should not be detected. If comparative measurements are being used to determine if a design change has affected the performance of a system, the measurement system(s) should be capable of detecting a bias between the measurement results to confirm the design changed has affected the product's performance. If comparative measurements are being used as part of an Inter-laboratory Comparison (ILC), then the measurement system(s) should be incapable of detecting a bias between the measurements results, implying the measurement results correlate.

The process audit category 120 is an MSA category that is performed when validating the results of a process audit. For example, the process audit MSA 120 can be used to determine whether an audit can detect if a process meets a criteria. The process audit MSA category 120 has an associated Kappa decision rule 130 for determining whether to determine whether the audit results are valid.

FIG. 11 is a diagram of an exemplary process 1100 for carrying out the Kappa decision rule 130. As shown in FIG. 11, process 1100 begins with process 1110, which determines the criteria that will be used to audit the process. Next, process 1120 performs an MSA Road Map (see, FIG. 4 and related description, above) on the process audit against the audit criteria.

In process 1122, the Kappa decision rule kappa value is calculated be used for process audit MSAs to determine if the audit results are valid. The kappa value is a statistic that measures the agreement between appraisers when assessing the same object. More specifically, kappa is the ratio of the number of times two appraisers agree to the number of times they are expected to agree, and can be calculated as follows:

$$kappa = \frac{(P_o - P_e)}{(1 - P_e)} \quad (8)$$

where $P_o$ represents the number of times the appraisers agree, and $P_e$ represents the number of times the appraisers are expected to agree.

In process 1124, a threshold value for the Kappa decision rule 130 is determined. For example, the threshold value can be a predetermined value stored in, and retrieved from memory. In an embodiment, an upper threshold value for determining capability is a kappa value greater than 0.7, and a lower threshold value for determining marginal capability is a kappa value greater than 0.4. Next, decision 1126 compares the calculated kappa value with the decision threshold to determine whether the process output correlates with the audit results.

If the process audit MSA results meet the upper decision rule threshold, then the measurement system is considered capable and the audit results are validated.

If the process audit MSA results do not meet the decision rule threshold, the measurement system is considered incapable and the audit results are not considered valid. In such a case, a risk analyses 1028 can be performed to determine the risk of using the audit results; the customer can agree to the increased risk and records of the customer's acceptance maintained, and if the use of the audit results is determined to be of unacceptable risk, then the process audit MSA 120 can be performed again, considering changes in the audit criteria that may have introduced excessive variation in the audit process e.g., changes in the audit criteria that may have introduced excessive variation in the audit process.

If the Kappa decision rule threshold indicates marginal, then the audit results can be validated if one or more of the following are performed: (1) the audit is performed on a standardized set of audit results, and the Kappa decision rule threshold is met for a capable audit process; (2) the MSA customer agrees to any increased risk and the records of the MSA Customer's acceptance maintained; and (3) the feature's audit frequency can be reviewed and adjusted, as appropriate, to account for the increased customer risk.

Exemplary embodiments can use a ratio of variances rather than the ratio of standard deviations as outlined above. If this is the case the decision thresholds are re-calculated, for example, as in the following:

| MSA Category | Measurand | Calculation | Marginal | Capable |
|---|---|---|---|---|
| Conformity Assessment | % Tol | % Tol = 100% * ⌊MU/Tol⌋ | <7.7% | <2% |
| Process Assessment | % R&R | % GRR = 100% * ⌊GRR/TV⌋ | <7.7% | <2% |

Figure 12:
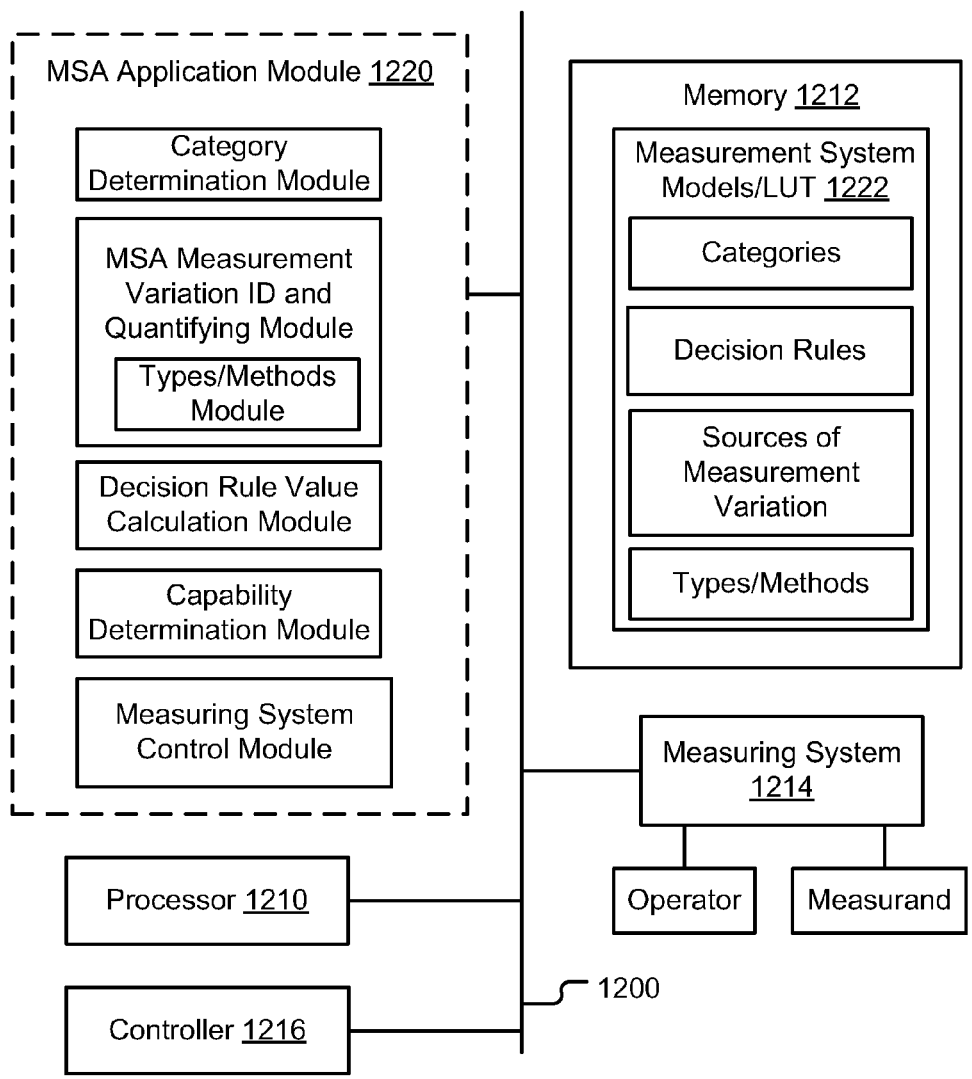
FIG. 12 is a diagram of a system for performing an MSA according to an exemplary embodiment.

FIG. 12 is a diagram of an exemplary MSA system according to an embodiment. The system includes an electronic network 1200, a processor 1210 (e.g., a microprocessor), memory 1212, a measuring system 1214 for measuring a measurand (e.g., a manufacture feature, process etc.) and can include an operator, a controller 1216 that can control the measuring system 1214, a MSA application module 1220 containing logic modules configured to carry out the MSA functions described herein. The various modules of the MSA application 1120 can access memory 1212 via processor 1210 to store and/or retrieve data from measurement system model/look up tables 1222 in order to carry out an MSA and store data for future MSAs. Additionally, the system can include an input/output interface (not shown) that allows a user/operator to input information related to determined categories sources of measurement variation etc. if the MSA application module 1120 is not yet populated with such data, or in embodiments where user input is required for a determination of the category, identification and/or evaluation of sources of measurement variation, choice of evaluation method (e.g., Type A/Type B methods).

Embodiments of an MSA system and method according to the disclosure can provide an approach to MSA that is structured around how the measurement system will be applied, i.e., the decision that will be made with the measurement data. The system and method set forth herein also can provide definitions for MSA terms, process flows/steps used to perform an MSA, set unambiguous expectations on the performance of a measurement system, and provide a score card to help measure when an MSA is complete. An MSA determined capable or acceptable and be used, for example, to control manufacturing processes, confirm non-technical business related metrics, evaluate design criteria, calibrate measurement processes and standards, and validate business processes.

Although a limited number of embodiments is described herein, one of ordinary skill in the an will readily recognize that there could be variations to any of these embodiments and those variations would be within the scope of the disclosure.

What is claimed is:

1. A method for measurement system analysis (MSA), comprising:
   determining, using a processor, a category of MSA from a plurality of MSA categories for a measurement system, each MSA category corresponding to a different application of the measurement system, and having a different decision rule associated therewith stored in a memory accessible by the processor;
   determining, using a processor, a type of the MSA based on a source of measurement variation for the measurement system;
   quantifying, using the processor, the measurement variation based on the determination of the type of the MSA;
   calculating, using the processor, a decision rule value based on the quantified measurement variation and the decision rule associated with the determined category of MSA;
   determining, using the processor, whether the measurement system is capable for performing MSA for the category based on a comparison of the calculated decision rule value and a first decision rule threshold value; and
   when it is determined that the measurement system is capable for performing MSA for the category, applying the measurement system to manage a quality of a manufacturing process or assist in a definition of product design.

2. The method according to claim 1, wherein the step of quantifying measurement variation includes:
   selecting a method of quantifying the source of measurement variation from a first group of methods when the source of measurement variation can be quantified experimentally and selecting a method of quantifying the source of measurement variation from a second group of methods when the source of measurement variation cannot be quantified experimentally.

3. The method according to claim 1, wherein when it is determined that the measurement system is incapable for performing MSA for the category, the steps of quantifying measurement variation, calculating a decision rule value, determining whether the measurement system is capable for performing MSA for the category are repeated with consideration to changes application or design of the measurement system.

4. The method according to claim 1, further comprising:
   determining whether the measurement system is marginally capable for performing MSA for the category based on the comparison of the calculated decision rule value and a second decision rule threshold value;
   determining whether the marginally capable measurement system is within an acceptable risk level; and
   applying the marginally capable measurement system having an acceptable risk level for performing MSA to manage the quality of a manufacturing process or assist in the definition of product design.

5. The method according to claim 1, wherein the determined category of MSA is one of conformity assessment, process analysis, calibration, comparative measurements, and process audit.

6. The method according to claim 1, wherein managing the quality of a manufacturing process screens for manufactures outside of a tolerance.

7. A system for measurement system analysis (MSA), comprising:
   a category determining module configured to determine a category of MSA from a plurality of MSA categories for a measurement system, each MSA category corresponding to a different application of the measurement system, and having a different decision rule associated therewith stored in a memory accessible by the category determining module;
   a MSA measurement variation quantifying module configured to determine a type of the MSA based on an identified source of measurement variation for the measurement system and to quantify the identified source of measurement variation based on the determination of the type of the MSA;
   a decision rule value calculation module configured to calculate a decision rule value based on the quantified measurement variation and the decision rule associated with the determined category of MSA;
   a capability determination module configured to determine whether the measurement system is capable for performing MSA for the category based on a comparison of the calculated decision rule value and a decision rule threshold value; and
   a controller configured to apply a measurement system determined as capable for performing MSA to manage a quality of a manufacturing process or assist in a definition of product design.

* * * * *